US007618165B2

(12) United States Patent
Kamiya et al.

(10) Patent No.: US 7,618,165 B2
(45) Date of Patent: Nov. 17, 2009

(54) LED LAMP UNIT

(75) Inventors: Takayuki Kamiya, Aichi (JP); Hideki Kokubu, Aichi (JP)

(73) Assignee: Toyoda Gosei Co., Ltd., Nishikasugai-gun, Aichi-ken (JP)

( * ) Notice: Subject to any disclaimer, the term of this patent is extended or adjusted under 35 U.S.C. 154(b) by 0 days.

(21) Appl. No.: 11/634,083

(22) Filed: Dec. 6, 2006

(65) Prior Publication Data

US 2007/0127216 A1 Jun. 7, 2007

(30) Foreign Application Priority Data

Dec. 7, 2005 (JP) ........................... P2005-354026
Nov. 6, 2006 (JP) ........................... P2006-300279

(51) Int. Cl.
*B60Q 3/04* (2006.01)

(52) U.S. Cl. ....................... 362/362; 362/800; 361/773; 361/777; 361/778

(58) Field of Classification Search ................. 362/362, 362/545, 800; 257/98–100; 361/773, 777, 361/778
See application file for complete search history.

(56) References Cited

U.S. PATENT DOCUMENTS 3,609,475 A 9/1971 Kaposhilin
4,054,814 A 10/1977 Fegley et al.
4,630,183 A 12/1986 Fujita
4,984,057 A 1/1991 Mii
5,324,962 A 6/1994 Komoto et al.
5,828,172 A 10/1998 Berthold et al.
6,054,716 A 4/2000 Sonobe et al.
6,849,867 B2 2/2005 Roberts et al.
6,888,723 B2 5/2005 Kamiya et al.
2005/0007777 A1* 1/2005 Klipstein et al. ............ 362/244
2006/0220052 A1 10/2006 Kamiya et al.
2006/0261362 A1 11/2006 Noda et al.
2007/0001189 A1 1/2007 Chou

FOREIGN PATENT DOCUMENTS

CN 1558452 A 12/2004
JP 05-62059 8/1993
JP 11-103096 4/1999
JP 2000-216442 8/2000
JP 2003-258314 9/2003

OTHER PUBLICATIONS

Chinese Office Action dated Mar. 21, 2008, with English Language translation.
United States Office Action dated Sep. 9, 2009 in U.S. Appl. No. 11/435,278.

* cited by examiner

*Primary Examiner*—Sandra L O'Shea
*Assistant Examiner*—Meghan K Dunwiddie
(74) *Attorney, Agent, or Firm*—McGinn IP Law Group, PLLC

(57) ABSTRACT

There is provided an LED lamp unit comprising an LED lamp, a protective component for an LED lighting circuit, a circuit section and a case part, characterized in that the circuit section has a metal plate which is embedded in the case part with its surface partially exposed, a lead of the LED lamp is electrically connected to the exposed surface of the metal plate, and the protective component for the LED lighting circuit is connected to the metal plate at an opposite side to a side where the lead of the LED lamp is connected.

23 Claims, 5 Drawing Sheets

LED LAMP UNIT

CROSS REFERENCE TO THE RELATED APPLICATIONS

The present application is related to U.S. patent application Ser. No. 11/387,874, filed on Mar. 24, 2006, to Takayuki KAMIYA, et al., entitled "LED LAMP APPARATUS AND MANUFACTURING METHOD THEREOF" having and to U.S. patent application Ser. No. 11/435,278, filed on May 17, 2006, to Kazushi NODA, et al., entitled: "LED LAMP AND LED LAMP APPARATUS" having, both assigned to the present assignee, and incorporated herein by reference.

BACKGROUND OF THE INVENTION

1. Field of the Invention

The present invention relates to an LED lamp unit.

2. Description of the Related Art

Conventionally, as an LED lamp, a lamp type and an SMD (surface mount device) type have been known. In case where these LED lamps are used as vehicle lamps, for example, an LED lamp unit has been constructed by soldering leads of the LED lamp to a printed board, and then, embedding the printed board into a case part, and the LED lamp unit thus constructed has been mounted to a determined position of the vehicle. The printed board has been arranged in an illumination control device in the vehicle, whereby flashing and lightness of the LED when the LED is lighted up have been controlled by switches and control circuits in the vehicle.

In the conventional LED lamp unit as described above, the printed board on which the LED lamp is mounted has been formed of resin, and therefore, in some cases, radiation of heat from the LED lamp or heat at the time of mounting has been insufficient. In order to solve the problem, the applicant of the invention has proposed in the prior patent application (JP-A-2003-258314) such a structure of an LED lamp unit that the circuit section is formed of a metal plate, whereby effective heat radiation has been achieved to enhance reliability, and at the same time, the LED lamp unit has been less influenced by the heat on occasion of mounting the LED lamp, thereby to realize high manufacturing yield.

Also, JP-A-H11-103096 and JP-A-2000-216442 exists as related art.

In the LED lamp unit disclosed in JP-A-2003-258314, an LED lamp, a resistor element, a diode and so on are connected to a same plane of the metal plate which constitutes the circuit section. In such a structure, spaces for respective components, and connecting regions of the respective components on the metal plate must be secured on the same plane, and hence, it is difficult to make the unit compact. Under the circumstance, the invention makes it a main problem to provide an LED lamp unit of a type that a circuit section is formed of a metal plate, which can be made more compact in structure.

SUMMARY OF THE INVENTION

In order to solve the above described problem, a first structure of the invention is as follows. Specifically, there is provided an LED lamp unit comprising an LED lamp, a protective component for an LED lighting circuit, a circuit section and a case part, characterized in that the circuit section has a metal plate which is embedded in the case part with its surface partially exposed, a lead of the LED lamp is electrically connected to the exposed surface of the metal plate, and the protective component for the LED lighting circuit is connected to the metal plate at an opposite side to a side where the lead of the LED lamp is connected.

A second structure of the invention is characterized in that the protective component for the LED lighting circuit is connected to the metal plate at an opposite side to a position where the lead of the LED lamp exists, in such a manner that the metal plate is interposed between the lead of the LED lamp and the protective component for the LED lighting circuit.

On the other hand, a third structure of the invention is, in the first or second structure as described above, characterized in that an optical axis of the LED lamp is in parallel with a part of the metal plate where the lead of the LED lamp is connected.

A fourth structure of the invention is, in the structure as described in any one of the first to third structures, characterized in that the metal plate has a first region to which the lead of the LED lamp and the protective component for the LED lighting circuit are connected, and a second region which is substantially parallel to the first region and to which a resistor element is electrically connected. In this case, it is desirable that the second region is positioned at a side where the lead of the LED lamp is connected, as seen from the first region (a fifth structure).

In a sixth structure of the invention, an exposed part of the metal plate is formed with an LED connecting region to which the LED lamp is connected, a protective component connecting region to which the protective component for the LED lighting circuit is connected, and a first lead connecting region and a second lead connecting region to which leads (a first lead and a second lead) of the resistor element are respectively connected. The case part is characterized by having a pair of arm portions formed at one end side of the LED lamp unit and including a first arm portion and a second arm portion, the first lead connecting region being exposed from a distal end part of the first arm portion, and the second lead connecting region being exposed from a distal end part of the second arm portion. This first arm portion has a groove area into which a root of the first lead is inserted, a flat area which is parallel to the first lead connecting region and on which a middle part of the first lead is placed, and a guide area which is a wall face erected from the flat area and adapted to guide the middle part of the first lead. In the same manner, the second arm portion has a groove area into which a root of the second lead is inserted, a flat area which is parallel to the second lead connecting region and on which a middle part of the second lead is placed, and a guide area which is a wall face erected from the flat area and adapted to guide the middle part of the second lead.

It would be preferable that the first arm portion and the second arm portion are connected to each other in their distal end parts (a seventh structure), and it would be further preferable that a part of the metal plate near the LED connecting region is embedded in a connection area between the first arm portion and the second arm portion (an eighth structure).

In a ninth structure of the invention, in the sixth to eighth structures, the first lead connecting region and the second lead connecting region exist on the same plane, and the first lead connecting region and the second lead connecting region are substantially parallel to the LED connecting region.

A tenth structure of the invention is, in the sixth to ninth structures, characterized in that the protective component connecting region is formed on the metal plate at an opposite side to a side where the LED connecting region is formed.

According to the first structure of the invention, the protective component for the LED lighting circuit is electrically connected to the metal plate at the opposite side to the side where the lead of the LED lamp is connected. In this manner, a distance between the LED lamp and the protective component for the LED lighting circuit can be secured, whereby the LED lamp and the protective component for the LED lighting circuit can be connected to the metal plate within a small space, while restraining influences of the heats when they are respectively connected. Moreover, because both sides of the metal plate can be utilized to mount the components thereon, size of the metal plate can be reduced. As the results of the functions and effects as described above, a very compact LED lamp unit can be obtained. Further, according to the structure of the invention, the protective component is not directly connected to the lead of the LED lamp (the structure of directly connecting the protective component is disclosed in the above mentioned Patent Documents 2 and 3), and therefore, it is possible to prevent the LED lamp from being influenced by the heat when the protective component is connected, whereby the LED lamp unit which has high reliability and high manufacturing yield will be obtained.

On the other hand, according to the second structure of the invention, the protective component for the LED lighting circuit is mounted in such a manner that the metal plate is interposed between the lead of the LED lamp and the protective component for the LED lighting circuit, and therefore, the space for the LED lamp and the protective component for the LED lighting circuit can be minimized, whereby further downsizing can be achieved.

Moreover, according to the third structure of the invention, the compact and thin LED lamp unit which emits a light in parallel with the metal plate can be obtained.

According to the fourth structure of the invention, the metal plate has the second region which is substantially parallel to the first region to which the lead of the LED lamp and the protective component for the LED lighting circuit are connected, and the resistor element is electrically connected to the second region. Therefore, at least a part of the resistor element is contained in the space between the first region and the second region. As the results, it is possible to contain the resistor element in a small space, while restraining an increase of the space to be occupied by the metal plate (particularly, the space in a direction of thickness), and hence, further downsizing and thin thickness of the unit can be achieved.

According to the fifth structure of the invention, the second region of the metal plate to which the resistor element is connected is positioned at the same side where the lead of the LED lamp is connected, as seen from the first region. In this manner, it is possible to conduct connection of the lead of the LED lamp and connection of the resistor element in the same manufacturing step, and manufacturing process can be simplified.

According to the sixth structure of the invention, the metal plate will be positioned by the first arm portion and the second arm portion provided on the case part, which will facilitate connections of the components to be mounted. Particularly, when the leads of the resistor element are mounted, the leads will be supported and positioned by means of the first arm portion and the second arm portion, and consequently, it is possible to reliably connect the resistor element in a determined position.

According to the seventh structure of the invention, the first arm portion and the second arm portion are connected to each other in their distal end parts thereby to take an annular structure, whereby positional displacements of the arm portions can be prevented. As the results, production yield and reliability of the unit will be enhanced.

According to the eighth structure of the invention, a part of the metal plate near the LED connecting region is embedded in the connection area between the first arm portion and the second arm portion, whereby positioning of the LED connecting region can be achieved, and at the same time, positional displacement of the LED connecting region can be prevented.

According to the ninth structure of the invention, in a space between the plane which defines the first lead connecting region and the second lead connecting region and the plane which defines the LED connecting region, at least apart of the resistor element will be contained. As the results, it is possible to contain the resistor element in a small space, while an increase of the space to be occupied by the metal plate is restrained, and hence, the unit can be made more compact and thinner.

According to the tenth structure of the invention, the LED lamp and the protective component for the LED lighting circuit are mounted so as to interpose the metal plate between them, and hence, the size of the unit will be further reduced.

BRIEF DESCRIPTION OF THE DRAWINGS

FIG. 1(*a*) shows the LED lamp unit 1 at a side where an LED lamp 2 is mounted, and FIG. 1(*b*) shows the LED lamp unit 1 at a side where a Zener diode 5 is mounted.

FIG. 3(*a*) is a plan view, and FIG. 3(*b*) is a left side view.

BRIEF DESCRIPTION OF THE PREFERRED EMBODIMENTS

Figure 1A:
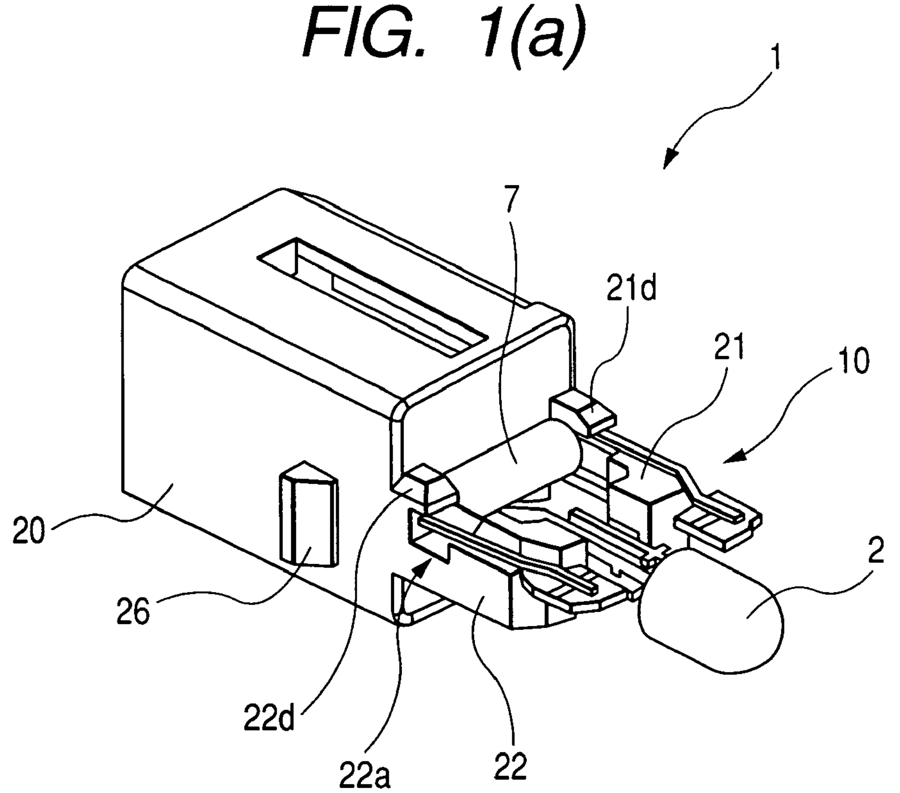
FIG. 1 is perspective views of an LED lamp unit 1 in an embodiment of the invention.
Figure 1B:
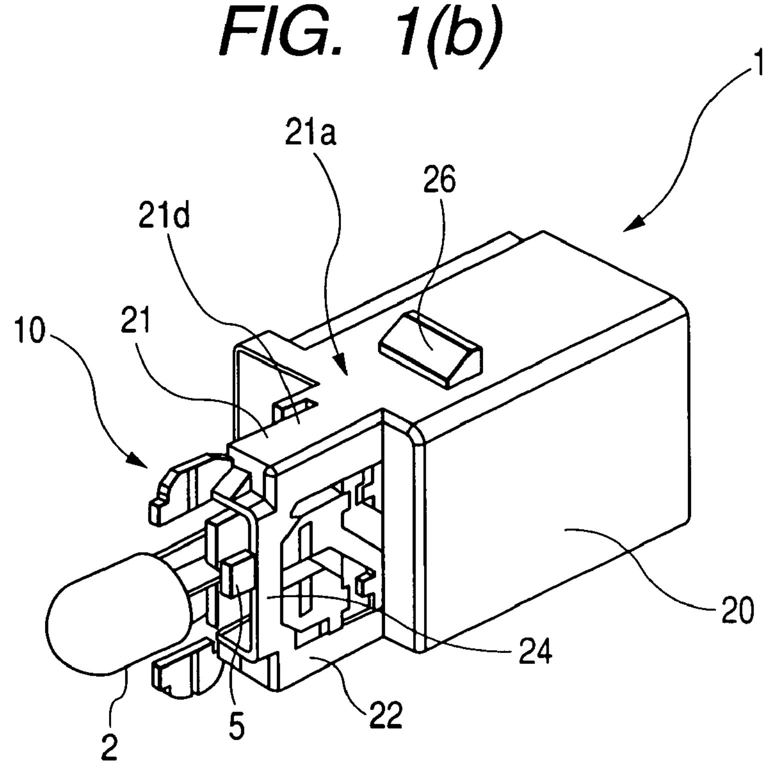
Figures 2A, 2B, 2C, 2D, 2E, 2F, 2G:
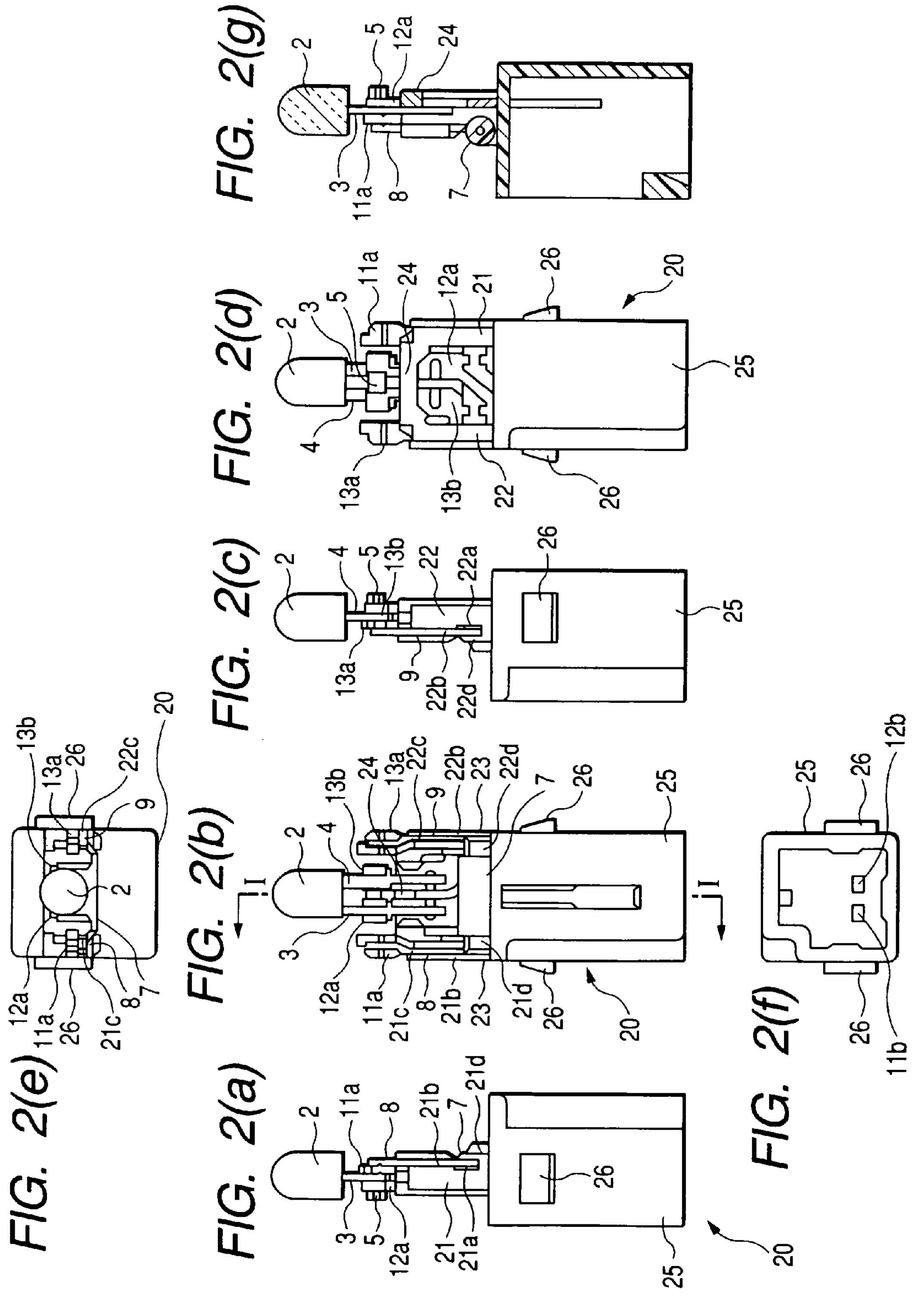
FIG. 2 shows the LED lamp unit 1 in the embodiment, in which (a) is a left side view, (b) is a front view, (c) is a right side view, (d) is a back view, (e) is a plan view, (f) is a bottom view, and (g) is a sectional view taken along a line I-I in (b).

Now, an embodiment of the invention will be described in detail, referring to the drawings. An LED lamp unit 1 in the embodiment is shown in FIGS. 1 and 2. FIG. 1 is perspective views of the LED lamp unit 1 in which (a) shows a structure at aside where an LED lamp 2 is mounted, and (b) shows a structure at the opposite side, respectively. FIGS. 2(*a*) to (*g*) are respectively a left side view, a front view, a right side view, a back view, a plan view, and a bottom view of the LED lamp unit 1, and a sectional view taken along a line I-I in (b). The LED lamp unit 1 includes an LED lamp 2, a Zener diode 5 as a protective component for an LED lighting circuit, a circuit section 10, and a case part 20.

The LED lamp 2 is a lamp type LED lamp. The LED lamp 2 in this embodiment incorporates a blue light emitting diode formed of group III nitride compound semiconductor. The LED lamp is a light source suitable for continuous illumination for a long time, because it has low power consumption, low heat generation, and long useful life.

Type of the LED lamp is not particularly limited, but in addition to the lamp type, various types such as a chip type can be employed. Moreover, color of the light emitted from the LED lamp is not particularly limited. In addition to the blue light employed in the embodiment, the LED lamps having light emitting wavelengths in the visible region, such as white, red, orange, green light, for example, can be employed. It is also possible to use an LED lamp which emits a light of an LED chip mixed with fluorescence, by converting the wavelength in a part of the light of the LED chip with fluorescent substance. The fluorescent substance can be contained, for example, in sealing resin for the LED lamp. Alternatively, a layer containing the fluorescent substance may be formed on a surface of the sealing resin. It is also possible to use an LED lamp in which a plurality of LED chips of same or different types are incorporated.

Figure 3A:
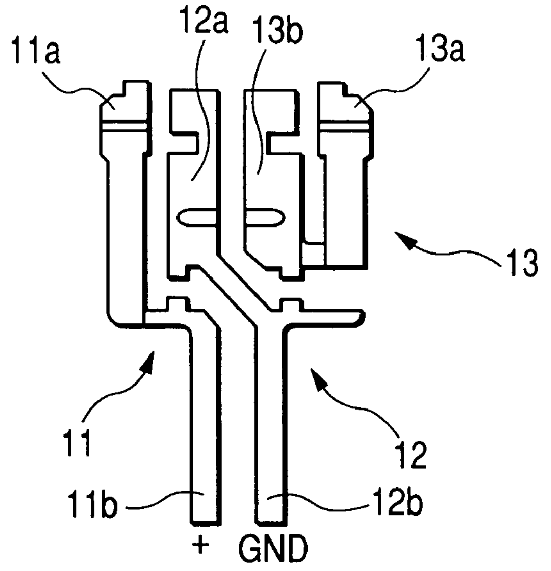
FIG. 3 shows metal plates 11, 12, 13 which constitute a circuit section 10 of the LED lamp unit 1.
Figure 3B:
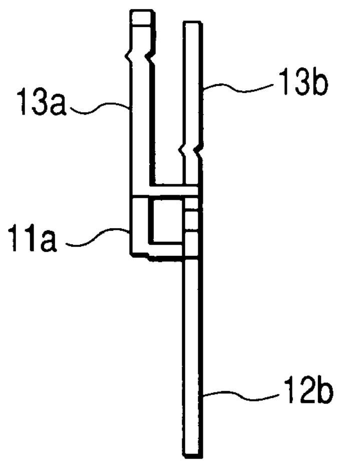
Figure 4:
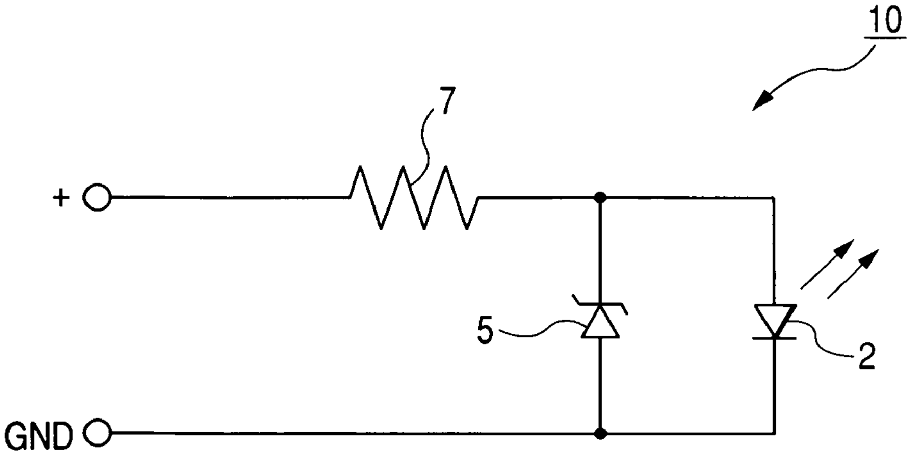
FIG. 4 shows the circuit section 10 of the LED lamp unit 1.
Figure 5A:
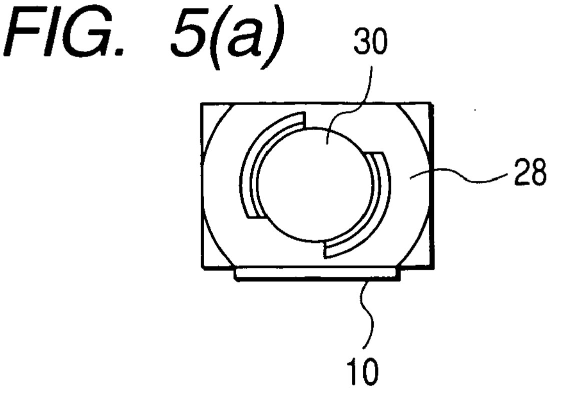
FIG. 5 shows an example of the LED lamp unit 1 having a cover fitted thereto.
Figure 5B:
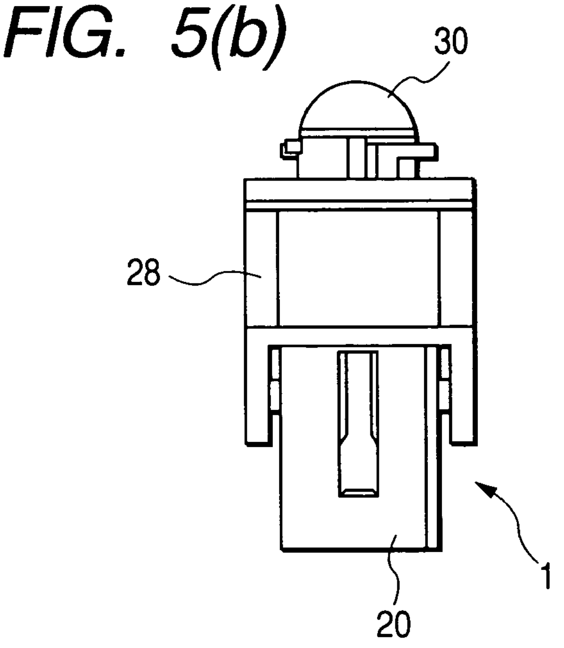
Figure 5C:
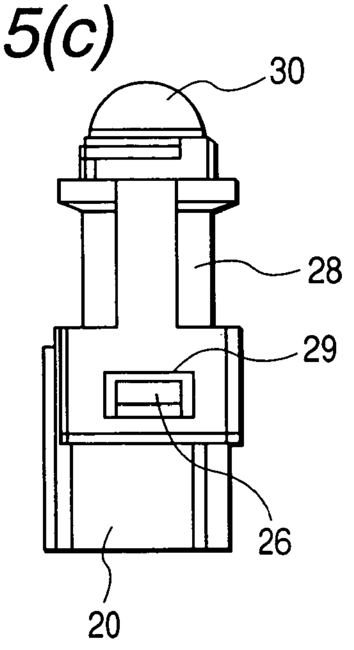
Figure 5D:
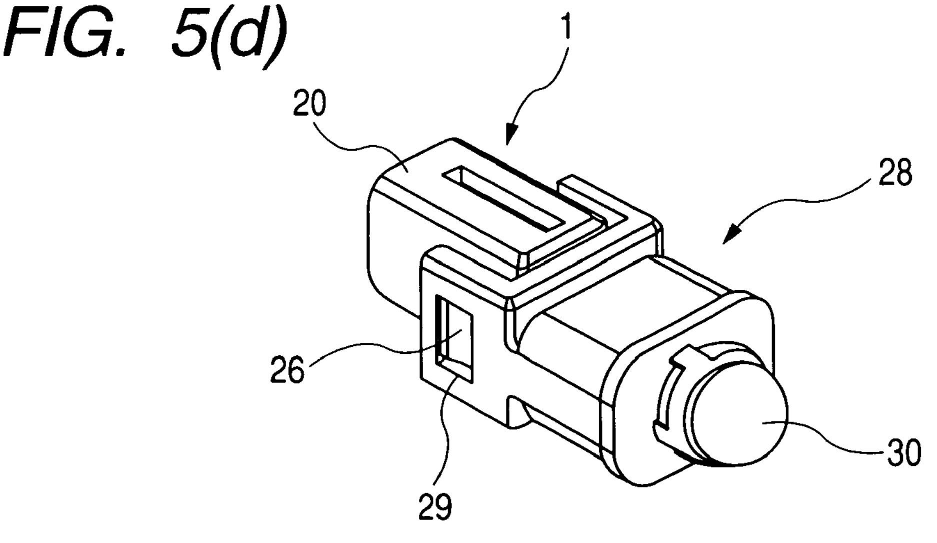

Metal plates which constitute the circuit section 10 of the LED lamp unit 1 are shown in FIG. 3. The LED lamp 2, the Zener diode 5, and a resistor (a resistor element) 7 are mounted (connected) to the three metal plates, thereby to form a circuit as shown in FIG. 4. In this embodiment, the Zener diode of the SMD type is employed to achieve downsizing of the unit. On the other hand, the resistor of a lead type is employed to enhance reliability.

A first metal plate 11 has a connecting portion 11*a* (a first lead connecting region) with respect to a lead 8 of the resistor 7, and a terminal 11*b* at a plus side. A second metal plate 12 has a connecting portion 12*a* (an LED connecting region) with respect to a lead 3 of the LED lamp 2, and a terminal 12*b* at a grounding side. A third metal plate 13 has a connecting portion 13*a* (a second lead connecting region) with respect to a lead 9 of the resistor 7, and a connecting portion 13*b* (an LED connecting region) with respect to a lead 4 of the LED lamp 2. The respective connecting portions of these metal plates are exposed from the case part 20 (See FIGS. 1 and 2).

The metal plates 11, 12, 13 can be obtained by stamping and bending sheets of electrically conductive metal, such as copper. It is also possible to employ steel plates which have been plated with copper or tin, as the material for the metal plates.

Moreover, as shown in FIGS. 1 and 2, an optical axis of the LED lamp 2 is in parallel with the metal plates. In this manner, the LED lamp unit 1 will emit a light which is in parallel with a longitudinal direction thereof.

Leg portions of the Zener diode 5 are mounted on back faces (a protective component connecting region) of the respective connecting portions 12*a*, 13*b* with respect to the leads 3, 4 of the LED lamp 2. By thus mounting the LED lamp 2 and the Zener diode 5 on both the front and back faces of the metal plates, a distance between the LED lamp 2 and the Zener diode 5 can be secured. In this manner, influence of the heat on the Zener diode 5 at the time of connecting the LED lamp 2, and influence of the heat on the LED lamp 2 at the time of connecting the Zener diode 5 can be depressed, while space saving is attained. Moreover, because the Zener diode 5 is mounted on the back faces of the metal plates just at positions where the leads 3, 4 of the LED lamp 2 are arranged, downsizing of the metal plates will be achieved. Meanwhile, because the Zener diode 5 is not directly connected to the leads 3, 4 of the LED lamp 2, it is possible to prevent the LED lamp 2 from being affected by the heat at the time of connecting the Zener diode 5. In this manner, reliability and manufacturing yields will be enhanced.

On the other hand, the connecting portions 12*a*, 13*b* with respect to the leads 3, 4 of the LED lamp 2 and the connecting portions 11*a*, 13*a* with respect to the leads 8, 9 of the resistor 7 are on the same plane. In other words, as seen from the connecting portions 12*a*, 13*b* with respect to the leads 3, 4 of the LED lamp 2, the connecting portions 11*a*, 13*a* with respect to the leads 8, 9 of the resistor 7 exist at the same side where the leads 3, 4 of the LED lamp 2 are connected. Accordingly, it is possible to conduct the connection of the leads 3, 4 of the LED lamp 2 and the connection of the leads 8, 9 of the resistor 7 in a same manufacturing step, which enables manufacturing process to be simplified.

Further, the respective connecting portions are arranged in such a positional relation that the connecting portions 11*a*, 13*a* with respect to the leads 8, 9 of the resistor 7 may be in parallel with the connecting portions 12*a*, 13*b* with respect to the leads 3, 4 of the LED lamp 2 (See FIG. 3(*b*)). As the results, the resistor can be contained between the connecting portions 11*a*, 13*a* and the connecting portions 12*a*, 13*b* without increasing the space to be occupied by the metal plates, whereby a compact structure will be realized (See FIG. 2 and FIG. 3(*b*)).

The leads 3, 4 of the LED lamp 2 are resistance-welded to the corresponding connecting portions. In the same manner, the leads 8, 9 of the resistor 7 are resistance-welded to the corresponding connecting portions. Although heat will be applied on these occasions of the resistance welding, the metal plates will be hardly affected by the heat, in contrast with the printed board formed of resin which has been employed in the prior art. A method of connecting the leads to the respective connecting portions is not limited to the resistance welding, but other methods such as soldering, laser-welding can be employed.

On the other hand, the Zener diode 5 is soldered to the corresponding connecting portions. A method of connecting the Zener diode 5 is not limited to soldering, too.

The case part 20 is formed of resin material by projection molding, incorporating the metal plates 11, 12, 13 as inserts. Although the material for molding the case part 20 is PBT in this embodiment, the material is not limited to this, but general-purpose resin such as PP, PE, ABS and others, bio-decomposing resin (bio-plastic) such as polylactic acid, ceramics and so on can be used.

The case part 20 has a first arm portion 21 and a second arm portion 22 which are projected from its one end side. The first arm portion 21 encloses a center part of the first metal plate 11 embedded therein, and a tip end of the first metal plate 11 (that is, the connecting portion 11*a*) is exposed from the distal end part of the first arm portion 21. In the same manner, the second arm portion 22 encloses a center part of the third metal plate 13 embedded therein, and a tip end of the third metal plate 13 (that is, the connecting portion 13*a*) is exposed from the distal end part of the second arm portion 22. The case part 20 is provided with a bearing seat 23 for the resistor 7 at a position where the first arm portion 21 and the second arm portion 22 are connected to the resistor 7. Specifically, grooves 21*a* and 22*a* in a C-shape in section are respectively formed in base parts of the first arm portion 21 and the second arm portion 22. Further, flat areas 21*b* and 22*b* including planes which are parallel to the connecting portions of the embedded metal plates (the connecting portion 11*a* of the first metal plate 11, in case of the first arm portion 21, and the connecting portion 13*a* of the third metal plate 13, in case of the second arm portion), and wall faces 21*c* and 22*c* erected from the flat areas 21*b*, 22*b* are respectively formed in the first arm portion 21 and the second arm portion 22 from their center parts to the distal end parts.

When the resistor 7 is mounted, a root of the lead 8 of the resistor 7 will be inserted into the groove 21*a* of the first arm portion 21 and held by a pressing part 21*d*. Meanwhile, the lead 8 will be guided and supported by the flat area 21*b* and the wall face 21*c* of the first arm portion 21. In the same manner, the lead 9 of the resistor 7 will be held, guided and supported by the groove 22*a*, the pressing part 22*d*, the flat area 22*b*, and the wall face 22*c* of the second arm portion 22. In this manner, the first arm portion 21 and the second arm portion 22 respectively function as holding members, guide members, and support members for the corresponding leads, and consequently, the resistor 7 can be reliably connected to a determined position. In this manner, mounting of the resistor 7 will be easily performed, and mounting accuracy will be enhanced.

In this embodiment, the first arm portion 21 and the second arm portion 22 are connected to each other in their distal end parts thereby to be formed in an annular shape as a whole. Accordingly, it is possible to prevent positional displacements of the first arm portion 21 and the second arm portion 22. As the results, production yield will be enhanced, and reliability of the unit will be also enhanced.

In a connection area 24 between the first arm portion 21 and the second arm portion 22, a part of the second metal plate 12 near the connecting portion 12*a* and a part of the third metal plate 13 near the connecting portion 13*b* are embedded. In this manner, positioning of the connecting portions will be achieved (positions of the three metal plates will be defined), and at the same time, positional displacements of the connecting portions will be prevented.

A connector connecting part 25 is formed at one end side of the case part 20, and the terminals 11*b*, 12*b* of the metal plates are contained in the connector connecting part 25. In short, the terminals 11*b*, 12*b* of the metal plates in the LED lamp unit 1 are connected to an external connector. For this reason, the connector connecting part 25 is so designed that its shape and size may match the external connector. It is also possible to connect the terminals of the metal plates to a harness, and in this case, the case part can be further made thinner.

A pair of hooks 26 are formed on side walls of the connector connecting part 25. These hooks 26 will be utilized, for example, in fitting a cover, which will be described below, to the LED lamp unit 1 or in installing the LED lamp unit 1 to a place for installation.

The cover is fitted over the LED lamp unit 1 according to necessity. For example, the cover is used for the purpose of protecting a section where the components such as the LED lamp 2 are mounted, from an external shock. Moreover, it is possible with the cover to arrange, control, and diffuse the light from the LED lamp 2, or to change the color of the light. For example, by using the cover of such a type that a taper face enlarged in diameter in a taper shape may be formed around the lens part of the LED lamp 2, irradiation angle of the light emitted from the LED lamp 2 can be regulated by this taper face. In this case, there is such anxiety that when the light from the LED lamp 2 is reflected by the taper face, the reflected light may interfere with the light which has been directly emitted from the LED lamp 2 in a direction of an optical axis thereof (un-reflected light), whereby annular stripes of interference may occur. Therefore, it is desirable that the light from the LED lamp 2 will not be substantially reflected by this taper face. As a method for preventing the substantial reflection of the light, the light which has directly entered from the LED lamp 2 may be diffused or absorbed on the taper face. In order to diffuse the light, it is desirable to provide minute undulation such as grain (for example, 100% delustered grain pattern) on the taper face. In order to absorb the light from the LED lamp 2, the taper face may be painted in black color or so.

FIG. 5 shows an example of the LED lamp unit 1 having the cover fitted thereto. FIGS. 5(*a*), (*b*), (*c*), and (*d*) are a plan view, a front view, a right side view, and a perspective view, respectively. In this example, a cover 28 is fitted to the LED lamp unit 1 at a side where the components are mounted. As shown in the drawings, the hooks 26 in the case part 20 of the LED lamp unit 1 are locked to fitting holes 29 which are formed at both side parts of the cover 28, whereby the cover 28 will be fitted to the LED lamp unit 1 in a fixed position. The cover 28 has a light transmitting resin portion 30 molded in a semispherical shape. This light transmitting resin portion 30 is formed of light transmitting resin which contains diffusing agent. When the cover is fitted, a head portion (the sealing resin) of the LED lamp 2 will be received inside the light transmitting resin portion 30. Consequently, the light from the LED lamp 2 will be diffused while the light passes the light transmitting resin portion 30, and thereafter, will be emitted to the exterior.

The LED lamp unit 1 is used, for example, as a light source of a device for illuminating an interior of a vehicle room. For use, the LED lamp unit 1 will be connected to an electrical wiring in the vehicle, by connecting its terminals 11*b*, 12*b* to the connectors, and will be controlled by a controller of the vehicle. In case where the LED lamp unit 1 is used as a vehicle room lamp, for example, ON or OFF of the LED lamp 2 and lightness of the LED lamp 2 while it is on will be controlled in response to opening and closing operation of a door.

Although the LED lamp unit in this embodiment is provided with the only one LED lamp, it is also possible to construct the LED lamp unit so that a plurality of the LED lamps may be provided thereon. The metal plates for constituting the circuit sections 10 may be additionally provided so that a plurality of the LED lamps may be independently controlled.

Figure 6:
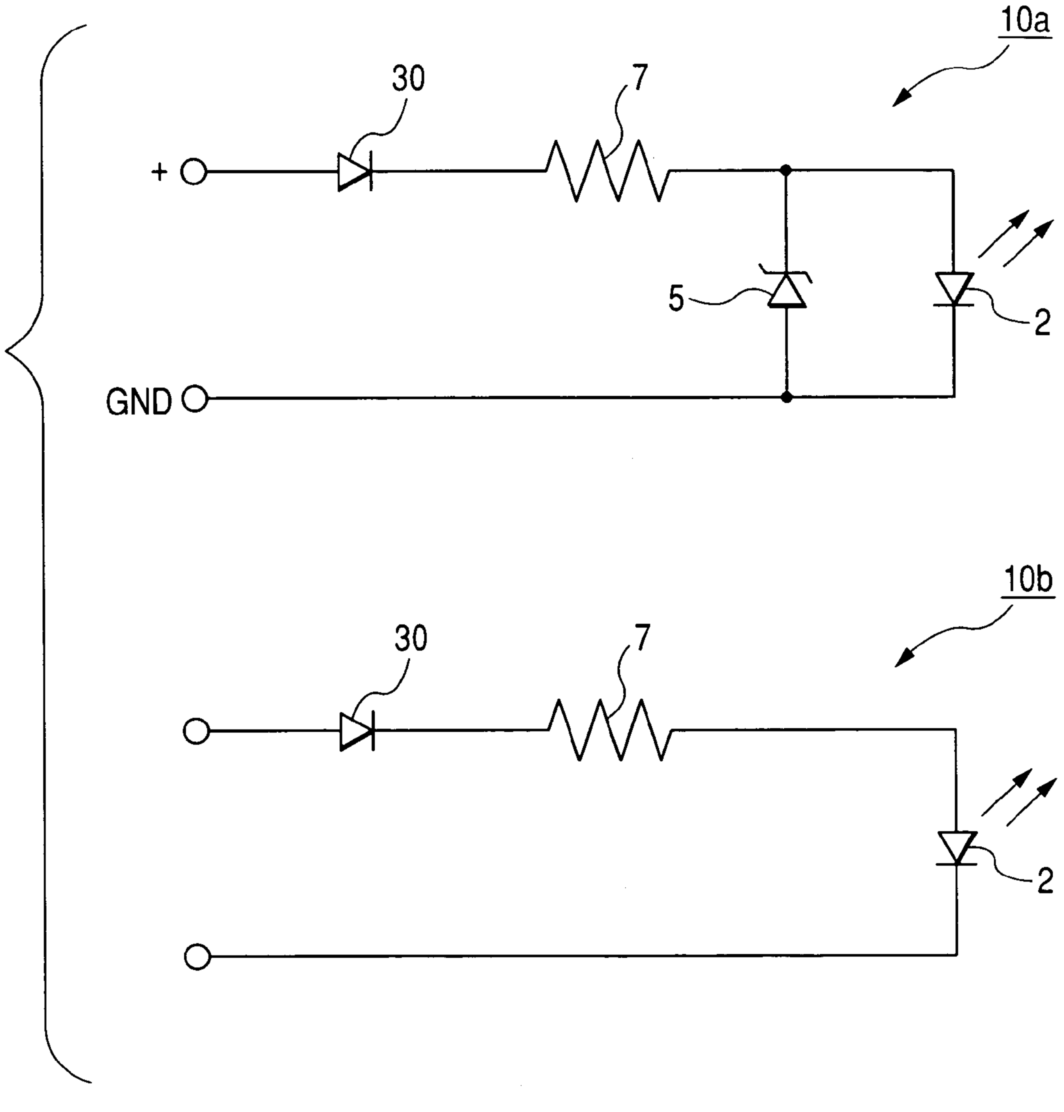
FIG. 6 shows structures of the circuit sections in other embodiments.

The circuit section in another embodiment is shown in FIG. 6. In the drawings, the same members as those in FIG. 4 will be denoted with the same reference numerals, and their description will be omitted. In a circuit section 10*a* as shown in FIG. 6(*a*), a rectifying diode 31 is provided in series with the LED lamp 2, thereby to protect the LED lamp 2 from high voltage inputted in an opposite direction. In a circuit section 10*b* as shown in FIG. 6(*b*), the rectifying diode 31 is provided in the same manner, but the Zener diode 5 is omitted.

The LED lamp unit in this invention can be utilized as light sources of various illuminating devices and light emitting devices. For example, the LED lamp unit will be favorably used as the light source of illumination inside the vehicle room (a map lamp, a foot lamp, etc.), an indicator and so on.

The invention is not limited to the mode for carrying out the invention and the embodiments as described above. It is construed that the invention includes various modifications within such a scope that those skilled in the art can easily attain, without deviating from the description of the claims.

What is claimed is:

1. An LED lamp unit comprising:

an LED lamp;

a protective component for an LED lighting circuit;

a circuit section and a case part;

wherein said circuit section has a metal plate which is embedded in said case part with said metal plate partially exposed, wherein a lead of said LED lamp is electrically connected to the exposed surface of said metal plate, and wherein said protective component for the LED lighting circuit is connected to said metal plate at an opposite side to a side where said lead of the LED lamp is connected.

2. The LED lamp unit as claimed in claim 1, wherein said protective component for the LED lighting circuit is connected to said metal plate at an opposite side to a position where the lead of said LED lamp exists, such that said metal plate is interposed between the lead of said LED lamp and said protective component for the LED lighting circuit.

3. The LED lamp unit as claimed in claim 1, wherein an optical axis of said LED lamp is in parallel with a part of said metal plate where the lead of said LED lamp is connected.

4. The LED lamp unit as claimed claim 1, wherein said metal plate has a first region to which the lead of said LED lamp and said protective component for the LED lighting circuit are connected, and a second region which is substantially parallel to said first region and to which a resistor element is electrically connected.

5. The LED lamp unit as claimed in claim 4, wherein said second region is positioned at a side where the lead of said LED lamp is connected, as seen from said first region.

6. The LED lamp unit as claimed in claim 1, wherein said case part has a pair of arm portions formed at one end side of the LED lamp unit and including a first arm portion and a second arm portion, wherein a first lead connecting region is exposed from a distal end part of said first arm portion and a second lead connecting region is exposed from a distal end part of said second arm portion.

7. The LED lamp unit as claimed in claim 6, wherein at least one of the LED lamp and the protective component for the LED lighting circuit is connected to the first lead connecting region and the second lead connecting region.

8. The LED lamp unit as claimed in claim 6, further comprising a resistor element, wherein the resistor element is connected to the first lead connecting region and the second lead connecting region.

9. The LED lamp unit as claimed in claim 6, wherein at least one of the first arm portion and the second arm portion has a groove area into which a root of a lead is inserted, a flat area which is parallel to at least one of the first lead connecting region and the second lead connection region and on which a middle part of the lead is placed, and a guide area which is a wall face erected from the flat area and adapted to guide the middle part of the lead.

10. The LED lamp unit as claimed in claim 1, wherein the protective component comprises a resistor element.

11. The LED lamp unit as claimed in claim 1, wherein said metal plate comprises first and second plates which include a connecting portion and a terminal portion, and a third plate comprising first and second connecting portions, wherein said connecting portion of said second plate and said second connecting portion of said third plate are formed on a first plane.

12. The LED lamp unit as claimed in claim 11, wherein said terminal portion of said second plate is formed on said first plane, and said protective component is connected to said connecting portion of said second plate.

13. The LED lamp unit as claimed in claim 11, wherein said connecting portion of said first plate and said first connecting portion of said third plate are formed on a second plane, and said first plane is parallel with said second plane.

14. An LED lamp unit, comprising:

an LED lamp;

a protective component for an LED lighting circuit;

a resistor element;

a circuit section; and a case part;

wherein said circuit section has a metal plate which is embedded in said case part with the metal plate partially exposed, an exposed part of said metal plate is formed with an LED connecting region to which said LED lamp is connected, a protective component connecting region to which said protective component for the LED lighting circuit is connected, and a first lead connecting region and a second lead connecting region to which leads (a first lead and a second lead) of said resistor element are respectively connected, said case part has a pair of arm portions formed at one end side of the LED lamp unit and including a first arm portion and a second arm portion, said first lead connecting region being exposed from a distal end part of said first arm portion, said second lead connecting region being exposed from a distal end part of said second arm portion, said first arm portion has a groove area into which a root of said first lead is inserted, a flat area which is parallel to said first lead connecting region and on which a middle part of said first lead is placed, and a guide area which is a wall face erected from said flat area and adapted to guide the middle part of said first lead, and said second arm portion has a groove area into which a root of said second lead is inserted, a flat area which is parallel to said second lead connecting region and on which a middle part of said second lead is placed, and a guide area which is a wall face erected from said flat area and adapted to guide the middle part of said second lead.

15. The LED lamp unit as claimed in claim 14, wherein said first arm portion and said second arm portion are connected to each other in their distal end parts.

16. The LED lamp unit as claimed in claim 15, wherein a part of said metal plate near said LED connecting region is embedded in a connection area between said first arm portion and said second arm portion.

17. The LED lamp unit as claimed in claim 14, wherein said first lead connecting region and said second lead connecting region exist on the same plane; and said first lead connecting region and said second lead connecting region are substantially parallel to said LED connecting region.

18. The LED lamp unit as claimed in, claim 14 wherein said protective component connecting region is formed on said metal plate at an opposite side to a side where said LED connecting region is formed.

19. The LED lamp unit as claimed in claim 14, wherein said metal plate includes a first metal plate, a second metal plate, and a third metal plate;

said first metal plate is provided with said first lead connecting region at its one end side, and a plus side terminal at the other end side;

said second metal plate is provided with said LED connecting region and said protective component connecting region at its one end side, and a grounding side terminal at the other end side; and said third metal plate is provided with said LED connecting region and said protective component connecting region at its one end side, and said second lead connecting region at the other end side.

20. The LED lamp unit as claimed in claim 15 wherein said protective component connecting region is formed on said metal plate at an opposite side to a side where said LED connecting region is formed.

21. The LED lamp unit as claimed in claim 16 wherein said protective component connecting region is formed on said metal plate at an opposite side to a side where said LED connecting region is formed.

22. The LED lamp unit as claimed in claim 17 wherein said protective component connecting region is formed on said metal plate at an opposite side to a side where said LED connecting region is formed.

23. A metal plate package for an LED lamp unit, comprising:

a metal plate; and a case part;

wherein said metal plate is embedded in said case part with the metal partially exposed; an exposed part of said metal plate is formed with an LED connecting region to which said LED lamp is connected, and a first lead connecting region and a second lead connecting region to which leads (a first lead and a second lead) of said resistor element are respectively connected; said case part has a pair of arm portions formed at one end side of the metal plate package and including a first arm portion and a second arm portion, said first lead connecting region being exposed from a distal end part of said first arm portion, and said second lead connecting region being exposed from a distal end part of said second arm portion;

said first arm portion has a groove area into which a root of said first lead is inserted, a flat area which is parallel to said first lead connecting region and on which a middle part of said first lead is placed, and a guide area which is a wall face erected from said flat area and adapted to guide the middle part of said first lead; and said second arm portion has a groove area into which a root of said second lead is inserted, a flat area which is parallel to said second lead connecting region and on which a middle part of said second lead is placed, and a guide area which is a wall face erected from said flat area and adapted to guide the middle part of said second lead.

* * * * *